United States Patent [19]

Randazzo et al.

[11] Patent Number: 5,720,097
[45] Date of Patent: Feb. 24, 1998

[54] APPARATUS FOR INSERTING INSULATORS

[75] Inventors: Antonio Randazzo, Portogruaro; Antonio Lumini, Sesto Fiorentino; Rossano Galassi, Florence, all of Italy

[73] Assignee: Axis USA, Inc., Tampa, Fla.

[21] Appl. No.: 418,635

[22] Filed: Apr. 7, 1995

[51] Int. Cl.$^6$ .................................................. H02K 15/00
[52] U.S. Cl. .................................... 29/564.6; 29/33 L
[58] Field of Search .................... 29/564.6, 564.8, 29/564.1, 564.4, 596, 33 L, 734; 156/495

[56] References Cited

U.S. PATENT DOCUMENTS

| Re. 34,195 | 3/1993 | Santandrea | 29/33 L |
|---|---|---|---|
| 3,634,932 | 1/1972 | Mason | 29/564.64 |
| 3,694,887 | 10/1972 | Walker et al. | 29/564.6 |
| 4,233,729 | 11/1980 | Koenig | 29/564.6 |
| 4,305,199 | 12/1981 | Barrett et al. | 29/564.6 |
| 4,387,001 | 6/1983 | Burns et al. | 156/495 |
| 4,495,692 | 1/1985 | Walker | 29/564.1 |
| 4,854,033 | 8/1989 | Luciani | 29/564.6 X |

FOREIGN PATENT DOCUMENTS

| 1035736 | 8/1983 | U.S.S.R. | 29/596 |
|---|---|---|---|

*Primary Examiner*—William R. Briggs
*Attorney, Agent, or Firm*—Fish & Neave; Robert R. Jackson

[57] ABSTRACT

Insulating strip material for dynamo-electric machine parts (e.g., for armature core slot liners) is fed out intermittently by a reciprocating assembly which releasably clamps the strip material during at least a portion of the assembly's stroke in one direction. The material that has been fed out is cut off, formed into the desired shape (if necessary), and inserted into the dynamo-electric machine part during further motion of the reciprocating assembly.

21 Claims, 8 Drawing Sheets

APPARATUS FOR INSERTING INSULATORS

BACKGROUND OF THE INVENTION

This invention relates to methods and apparatus for making dynamo-electric machine parts, and more particularly to methods and apparatus for inserting insulators or similar components into dynamo-electric machine parts such as electric motor armatures and stators.

References such as Ott U.S. Pat. No. 3,758,937, Copeland et al. U.S. Pat. No. 4,136,433, and Santandrea et al. U.S. Pat. No. Re. 34,195 show that it is typical to line the slots in the core of a dynamo-electric machine armature with paper insulators prior to winding the wire coils on the core. After the coils have been wound, the Ott patent points out that paper coil stays may be inserted in the slots over the coils to provide additional insulation and coil stabilization. The gaps between the poles of dynamo-electric machine stators may similarly be lined with insulating paper prior to winding wire coils on the poles.

Although "paper" is referred to in the preceding paragraph, it will be understood that any suitable, initially web-like material can be employed. Thus the term "insulating material" is used herein as a generic term for any web-like liner or insert, whether for insulation, coil stabilization, and/or any other generally similar purpose. Similarly, the term "slot" is used herein as a generic term for any area of a dynamo-electric machine part requiring the insertion of insulating material. For example, a "slot" may be the space between two poles on the core of a dynamo-electric machine armature or stator, either before or after coils have been wound on that core. A "slot" may thus have any of a wide variety of shapes.

In many prior art machines for inserting insulating material into slots, the insulating material is fed out lengthwise from a continuous supply between intermittently driven rollers. The intermittent drive of the rollers is such that feeding stops each time the required length of insulating material has been fed out. The fed out length is then cut off, formed into the required shape, and inserted into the slot. A problem with this technique is that as machine speed increases in order to increase productivity, it becomes increasingly difficult to precisely control the length of the insulating material fed out. Precise length control is desirable to make sure that the entire slot is insulated, but that there is no wasteful, unsightly, and possibly hazardous excess of insulating material extending beyond the ends of the slot. Intermittent roller drive is difficult to control at high machine speeds because of the large inertia of the rollers. This in turn is deleterious to precise control of the length of the insulating material fed out, and therefore cut off and inserted in the slots. It is also typically relatively difficult and time-consuming to adjust these prior art machines for different dynamo-electric machine parts requiring different lengths of insulating material. For example, there may be a complex geometric relationship between the sizes or shapes of various machine control parts and the length of the insulating material fed out.

Machines of the type shown in Santandrea et al. U.S. Pat. No. Re. 34,195 offer a number of advantages over the other machines described above. In the Santandrea et al. machine insulating material is fed out by a continuously rotating drive wheel. The paper stops when its free end hits an abutment. The drive wheel then slips on the stopped insulating material. The insulating material that has been fed out is cut off for shaping and insertion into a slot, while the feeding out of material resumes. This machine produces very precise and easily (even automatically) adjustable insulating material lengths. At very high production rates, however, it can be difficult to use the free end of the insulating material to stop the feeding out of that material without deforming the end of the material.

In view of the foregoing, it is an object of this invention to provide improved methods and apparatus for inserting insulating material into slots of dynamo-electric machine parts.

It is a more particular object of this invention to provide methods and apparatus for positively controlling the intermittent feeding of insulating material without the need to overcome large inertial forces of components in contact with the insulating material.

It is still another object of this invention to provide methods and apparatus for positively controlling the intermittent feeding of insulating material with components that are easily and quickly adjustable or changeable to change the length of the insulating material fed out.

SUMMARY OF THE INVENTION

These and other objects of the invention are accomplished in accordance with the principles of the invention by feeding the insulating material out using a reciprocating, releasable clamp. At a first predetermined point in its forward stroke the clamp grips the insulating material. This begins the feeding out of that material. At a second predetermined point in the forward stroke of the clamp the clamp releases the insulating material, which allows the material to stop. The distance between the first and second points corresponds to the desired length of insulating material. This length of material is then cut off, formed into the desired shape (if necessary), and inserted in a dynamo-electric machine part slot. The reciprocating clamp remains open throughout its return stroke so that the insulating material is not pulled back. The cycle of forward and backward strokes is repeated to feed out and cut off successive lengths of insulating material.

The dynamo-electric machine part may be indexed after each slot receives a length of insulating material to position the next slot in the part to receive the next length of material.

In particularly preferred embodiments the insulating material fed out during a forward stroke of the clamp is cut off and shaped (if necessary) during the subsequent return stroke of the clamp. That piece of insulating material is then inserted in a slot during the next forward stroke of the clamp, which next forward stroke also feeds out the next length of insulating material to be cut off. Thus work is being done on the insulating material during both the forward and return strokes of the clamp. Moreover, during each forward stroke of the clamp two lengths of insulating material are being worked on at least partly concurrently (i.e., a new length is being fed out, and the previously fed out and cut off length is being inserted in a slot). These features of the particularly preferred embodiments mean that for a given production rate, the insulating material can be moved more slowly than in prior art machines in which a length of insulating material must be fed out, cut off, and inserted, all before feeding out of the next length begins. The relatively slower motion of the insulating material in accordance with particularly preferred embodiments of this invention has many advantages such as reduced machine wear, less likelihood of damage to the insulating material, more precise stopping of the insulating material being fed out (thereby facilitating better control of the length of insulating material cut off), etc.

The apparatus is quickly and easily adjustable to provide different lengths of insulating material because there tends to be a simple linear relationship (e.g., a one-for-one relationship) between (1) the distance between the above-mentioned first and second points and (2) the length of insulating material cut off. Large inertial forces of components in contact with the insulating material when that material should stop are not a factor with this invention because the insulating material is released from such components when it is to stop.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
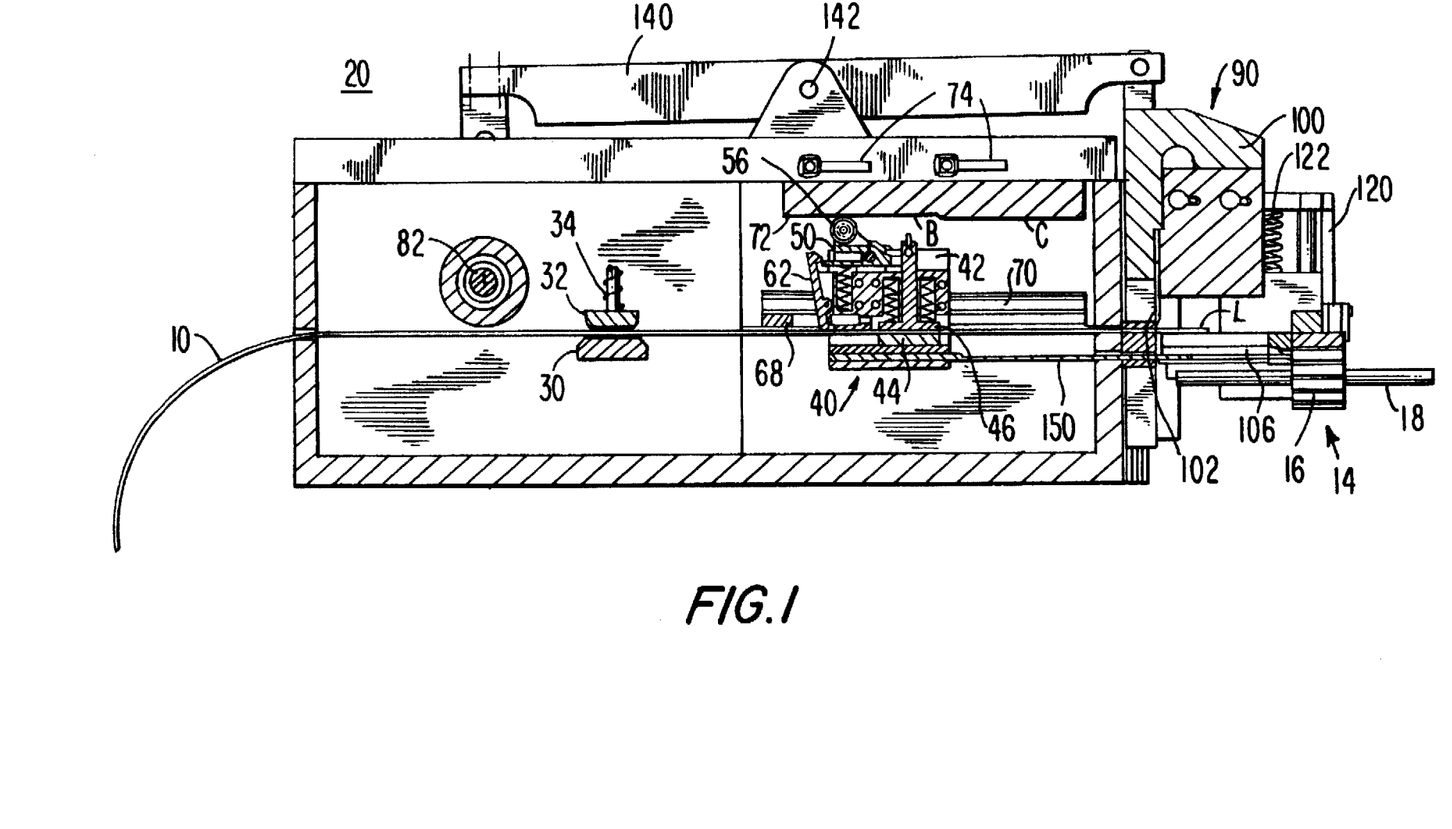
FIG. 1 is an elevational sectional view of illustrative apparatus constructed in accordance with this invention.
Figure 2:
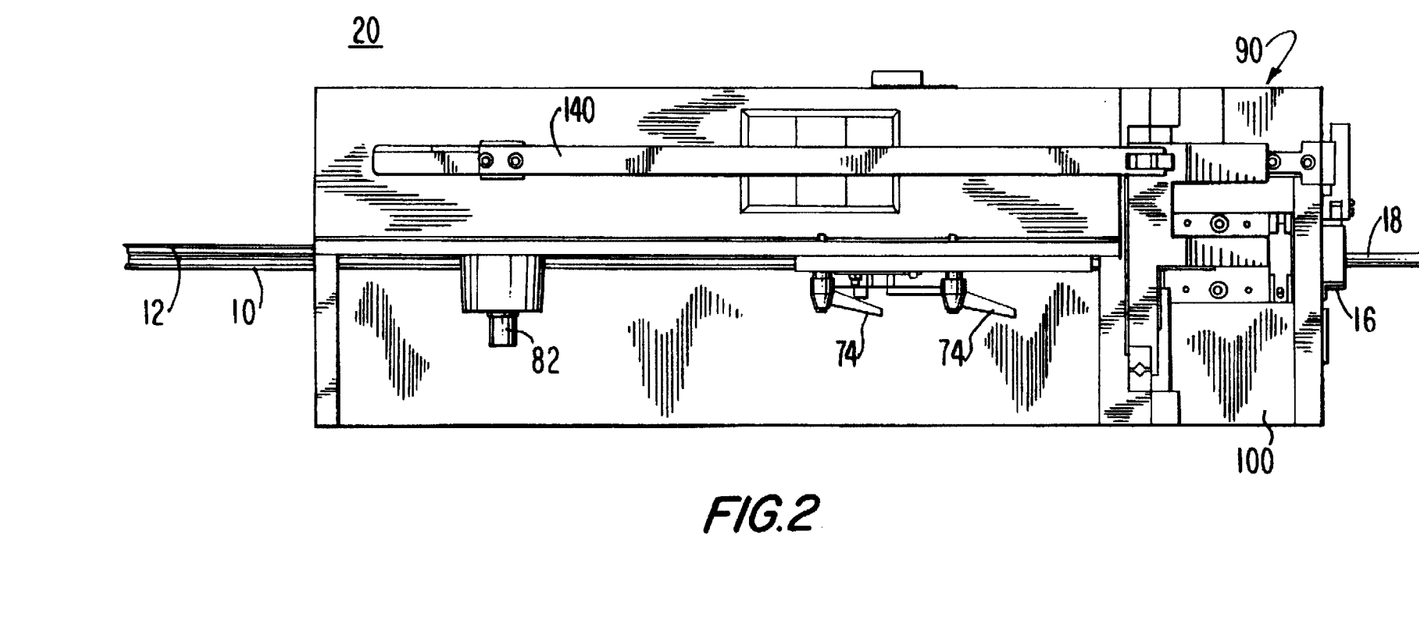
FIG. 2 is a top plan view of the apparatus shown in FIG. 1.

As shown in FIG. 1, a continuous strip 10 of insulating material is supplied from the left to the illustrative apparatus 20 of this invention. Any suitable insulating material supply may be used. For example, apparatus of the type shown on the left in FIG. 1 of Santandrea et al. U.S. Pat. No. Re. 34,195 may be used. Thus the strip 10 shown entering on the left in FIG. 1 herein may be coming from the variable length loop of material 10 shown on the left in FIG. 1 of the Santandrea et al. patent. Strip 10 may already be longitudinally scored (to facilitate subsequent forming) when it enters apparatus 20. Such scoring of strip 10 is indicated by lines 12 in FIG. 2.

Strip 10 passes between the upper surface of stationary platen 30 and the lower surface of pressure pad 32. Pressure pad 32 is resiliently biased down toward platen 30 by prestressed compression coil spring 34. The purpose of elements 30, 32, and 34 is to apply some constant braking or retarding force to strip 10 so that the strip stops moving as soon as it is no longer being pulled forward by reciprocating clamp assembly 40 as will now be described.

Figure 3:
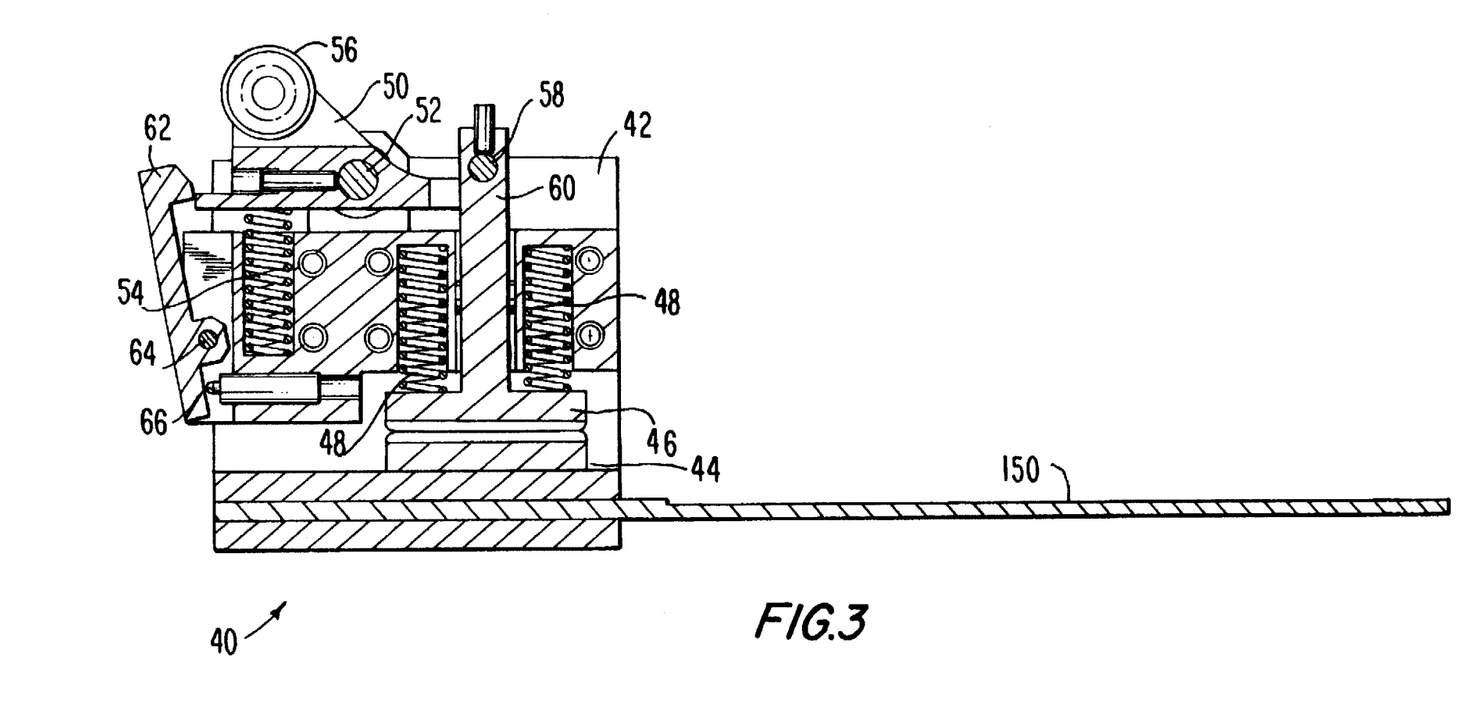
FIG. 3 is an enlarged sectional view of a portion of the apparatus shown in FIG. 1.

To the right of elements 30, 32, and 34 in FIG. 1 is reciprocating clamp assembly 40. Clamp assembly 40 includes a carriage 42 which is mounted on guide 70 for reciprocation along an axis which is parallel to the longitudinal axis of strip 10 (i.e., a left-right axis in FIG. 1). Clamp assembly 40 has a lower clamping jaw 44 which is fixed relative to carriage 42 and an upper clamping jaw 46 which is vertically reciprocable relative to carriage 42 (see also FIG. 3). Strip 10 (not shown in FIG. 3) passes between jaws 44 and 46. Jaw 46 is resiliently urged down toward jaw 44 by prestressed compression coil springs 48. When jaw 46 is solely under the influence of springs 48, strip 10 is firmly clamped between jaws 44 and 46. Jaw 46 can be lifted up out of contact with strip 10 by pivoting lever 50 counterclockwise (as viewed in FIGS. 1 and 3) about pivot shaft 52. Lever 50 is resiliently urged to rotate clockwise (as viewed in FIGS. 1 and 3) by prestressed compression coil spring 54. Lever 50 can be pivoted counterclockwise by downward force from cam follower roller 56.

Roller 56 bears on cam surface 72 which is mounted on the stationary frame of apparatus 20. When lever 50 is pivoted counterclockwise by the effect of cam surface 72, it raises upper jaw 46 via a clevis portion of the lever engaging under pin 58. (Prior to such counterclockwise pivoting there is preferably a clearance between pin 58 and the clevis portion of lever 50.) Pin 58 passes through a shaft 60 that extends upwardly from upper jaw 46.

Pivoting lever 50 counterclockwise also allows latch 62 to pivot clockwise about its pivot shaft 64. Latch 62 is resiliently urged to pivot clockwise about shaft 64 by plunger 66, which is resiliently urged to move to the left by a prestressed compression coil spring (not shown) acting on the plunger. Once latch 62 has pivoted clockwise, it keeps lever 50 pivoted counterclockwise, thereby holding jaw 46 up out of contact with strip 10. At the end of the leftward (return) stroke of carriage 42, the lower end of latch 62 contacts a stop 68 (FIG. 1) which is fixed relative to the stationary frame of apparatus 20. This causes latch 62 to pivot counterclockwise, thereby releasing lever 50 to pivot clockwise and allowing jaw 46 to drop and re-clamp strip 10 against jaw 44.

As is mentioned above and shown in FIG. 1, cam follower roller 56 bears on cam surface 72. During an initial portion of the forward (rightward) stroke of carriage 42, cam surface 72 is farther from guide 70 than it is during a final portion of that stroke. In FIG. 1 the initial portion of cam surface 72 is designated B and the final portion is designated C. (The lengths and locations of portions B and C in FIG. 1 are only illustrative and are not consistent with other features (e.g., length L) shown in that FIG.) While roller 56 is in contact with portion B, lever 50 is in the position which allows jaw 46 to clamp strip 10 against jaw 44. Accordingly, clamp assembly 40 is operative to advance strip 10 to the right with the rightward-moving clamp assembly. As soon as roller 56 reaches cam surface portion C, however, lever 50 is pivoted counterclockwise, thereby lifting jaw 46 out of clamping contact with strip 10. This causes strip 10 to immediately stop (e.g., under the influence of elements 30 and 32), even though assembly 40 is continuing to move to the right.

As has been noted, counterclockwise pivoting of lever 50 when roller 56 reaches cam surface portion C also allows latch 62 to pivot clockwise. Thus even when roller 56 leaves region C during the subsequent return (leftward) stroke of clamp assembly 40, strip 10 remains unclamped by jaws 44 and 46, and so strip 10 is not pulled back by any portion of the return stroke of the clamp assembly. At the left-most end of the return stroke, latch 62 hits stop 68, thereby unlatching lever 50 and allowing jaws 44 and 46 to re-clamp strip 10 in preparation for the next forward stroke of the clamp assembly. Thus it will be seen that clamp assembly 40 intermittently feeds out strip 10. In particular, during the initial portion of each forward stroke of assembly 40, a length of strip 10 equal to the distance along cam surface 72 from the starting point of roller 56 to the transition from B to C is fed out. (Again, the transition from B to C shown in FIG. 1 is not at a location consistent with other features shown in that Figure)

Figure 4:
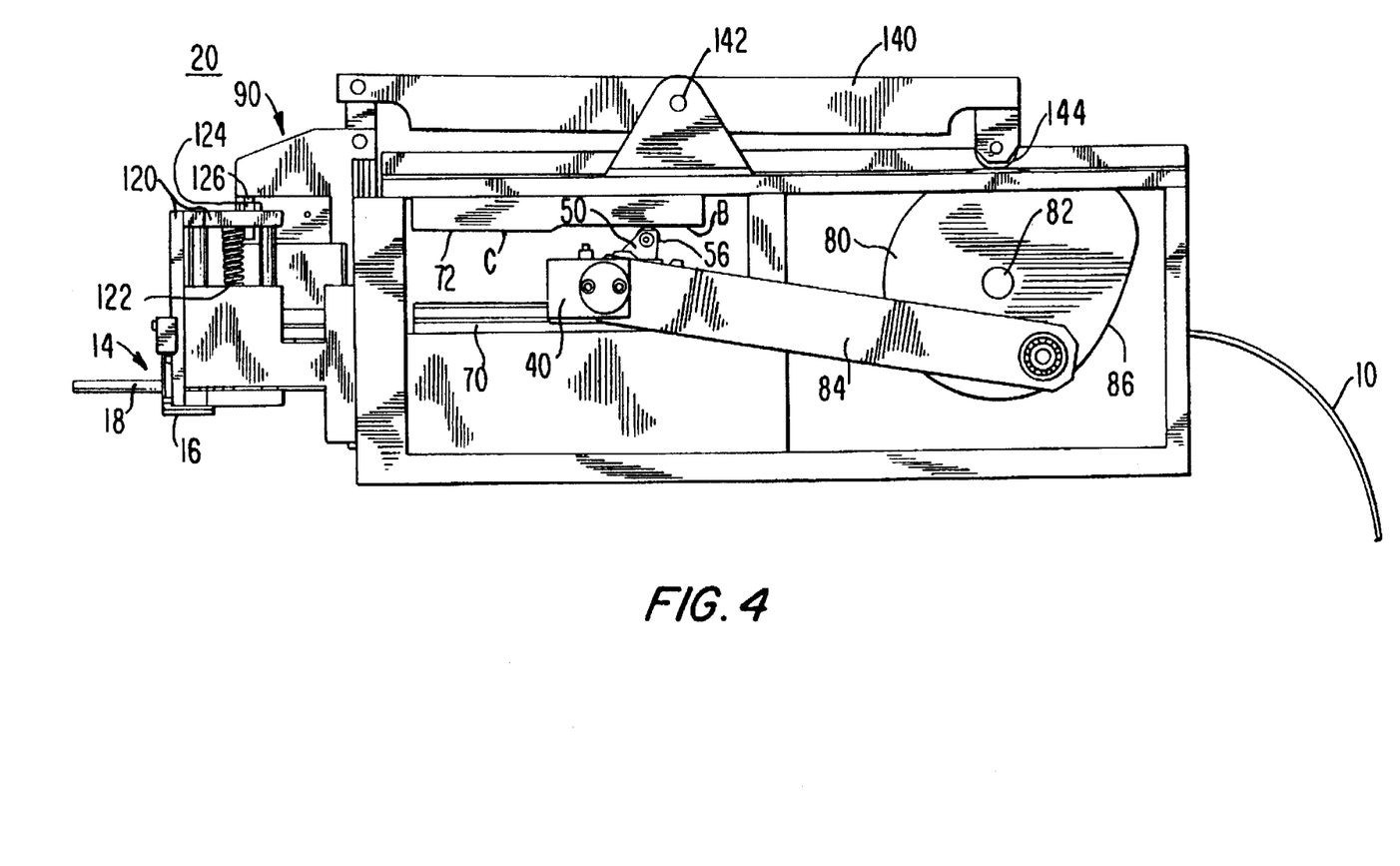
FIG. 4 is an elevational view of the side of the apparatus which is to the rear in FIG. 1.

The mechanism for reciprocating clamp assembly 40 is best seen in FIG. 4. A motor (not shown) rotates disk 80 via drive shaft 82. At one of its ends crank arm 84 is rotatably connected to disk 80 at a point which is radially spaced from shaft 82. The other end of crank arm 84 is rotatably connected to clamp assembly 40. Accordingly, rotation of disk 80 reciprocates assembly 40. In particular, each 360° revolution of disk 80 produces one forward and one backward stroke of assembly 40.

FIG. 4 also shows that the peripheral surface 86 of disk 80 is used as a cam for operating the portion 90 of apparatus 20 that (1) cuts off the length of insulating material strip 10 that has been fed out by clamp assembly 40, (2) forms the cut off length of strip material into the shape required for insertion into a slot, and (3) indexes the dynamo-electric machine part to position the next slot to receive the next formed length of strip material.

In the illustrative embodiment shown in the drawings the dynamo-electric machine part is an armature 14 having a ferromagnetic core 16 concentrically mounted on a shaft 18. Armature core 16 has several axially extending slots 17 spaced from one another in the circumferential direction around the core. Each of these slots must be aligned with a length of insulating material 10 equal to the length of the slot parallel to the longitudinal axis of shaft 18. Thus apparatus 20 is set up so that the distance along cam surface 72 from the point at which roller 56 contacts that surface at the start of a forward stroke of clamp assembly 40 to the transition between cam surface portions B and C is equal to the axial length of a slot 17. This will cause the apparatus to feed out a length L of strip 10 equal to the length of a slot 17 during the initial portion of each forward stroke of clamp assembly 40. Such a length L is shown in FIG. 1 (although not in proper synchronization with the depicted position or condition of clamp assembly 40) and in FIG. 5.

After such a length L has been fed out and the forward motion of strip 10 has been stopped, a movable portion 100 of cutting/forming/indexing assembly 90 begins to move down. An initial portion of this downward motion causes transversely aligned knife blade 102 to cut off length L of insulating material. A further portion of the downward motion of subassembly 100 causes axially aligned forming blade 104 to push cut off length L down into a stationary forming die 106 which is located beneath the forming blade. For example, forming die 106 may have a shape transverse to its length which is similar to the transverse shape of one of slots 17. After length L has been pushed down into forming die 106, subassembly 100 begins to move back up to its starting point. During this upward motion indexing pawl 110 operates to rotate armature 14 about its longitudinal axis by the amount necessary to align the next slot 17 requiring lining with the distal end of forming die 106. The indexing mechanism is described in more detail below in connection with FIG. 8.

The above-described downward and subsequent upward strokes of subassembly 90 are produced by pivoting of lever 140 about its pivot axis 142 (see especially FIG. 4). Lever 140 is pivoted by cam follower roller 144, which bears on the peripheral cam surface 86 of disk 80. In this embodiment the profile of cam surface 86 is synchronized with reciprocation of clamp assembly 40 (also produced by revolution of disk 80 as described above) so that the downward and upward strokes of subassembly 90 occur during the return stroke of assembly 40, preferably during a latter portion of that return stroke for reasons that will be apparent from the following description of the operation of insertion blade 150.

A final aspect of the operation of apparatus 20 that must be considered is the actual insertion of the cut and formed length of insulating material into a slot 17. This involves pushing the insulating material from forming die 106 into the slot 17 which is axially aligned with that die. This is accomplished by an insertion blade 150 which is carried by reciprocating clamp assembly 40. As is perhaps best seen in FIGS. 1 and 3, insertion blade 150 is attached to a lower portion of assembly 40 so that it is axially aligned with and can enter forming die 106 during a latter portion of each forward stroke of assembly 40. As the distal end of insertion blade 150 enters forming die 106, it engages the proximal end of the formed insulating material in the die and begins to push that material toward and into the axially aligned slot 17.

At the extreme end of the forward stroke of assembly 40, insertion blade 150 has pushed the insulating material fully into slot 17, and the distal end of insertion blade 150 is accordingly immediately adjacent the proximal face of armature core 16. Assembly 40 then begins its return stroke, leaving the insulating material properly positioned in slot 17, but withdrawing insertion blade 150 from die 106. As soon as blade 150 is out of die 106, the next cut length L of insulating material can be pushed down into die 106 by forming blade 104. Thus it will be seen that the downward stroke of subassembly 100 is timed to occur during a latter portion of the return stroke of assembly 40 when insertion blade 150 is out of die 106. Of course, at least in this embodiment, a final portion of the return stroke of assembly 40 coincides with the upward stroke of subassembly 100 so that knife blade 102 is out of the way when the feeding of strip 10 begins again at the start of the next forward stroke of assembly 40.

It should be noted that the operating sequence of the apparatus is such that the insulating material inserted into a slot 17 during each forward stroke of assembly 40 is the length of insulating material fed out during the preceding forward stroke of assembly 40. That length is cut off and formed during the return stroke of assembly 40 that also precedes the forward stroke that results in insertion of that length into a slot 17.

Figure 7:
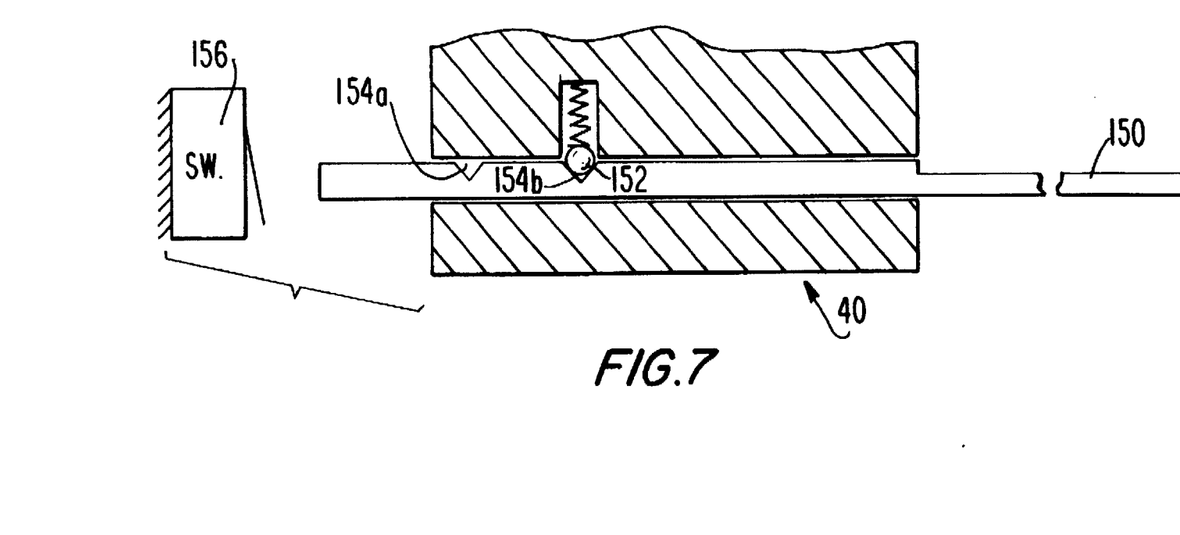
FIG. 7 is similar to a portion of FIG. 3, but with the addition of several optional details.

To facilitate detecting a jam in the apparatus, insertion blade 150 may be mounted on clamp assembly 40 so that if the insertion blade encounters unusually high resistance during its forward stroke, it can shift axially relative to assembly 40 in the return stroke direction. As shown in FIG. 7, for example, a first releasable detent (formed by spring-loaded ball 152 in recess 154a) may hold insertion blade 150 in a forward position relative to assembly 40 (i.e., the position shown in FIGS. 1 and 3). A second releasable detent (formed by spring-loaded ball 152 in recess 154b) may hold insertion blade 150 in a rearward shifted position relative to assembly 40 (i.e., the position shown in FIG. 7) after the insertion blade has shifted due to high resistance during a forward stroke. In the rearward shifted position the rear or proximal end of insertion blade 150 projects from the rear or proximal side of assembly 40, and this can be detected (e.g., by a proximity switch or a microswitch 156 on the stationary frame of the apparatus at or near the end of the return stroke of assembly 40). Detection of insertion blade shifting can be used to produce an alarm and to stop the machine until the malfunction has been investigated and corrected. Insertion blade 150 is then pushed back to its first detent position and operation of the apparatus is resumed.

It will be noted that it is very easy to change the length L of insulating material fed out during each forward stroke of assembly 40. For example, this can be done by shifting cam surface 72 left or right as viewed in FIG. 1. Any such shift produces a one-for-one change in length L. In other words, length L changes by the exact same amount that cam surface 72 is shifted. Rapid changes of this type are facilitated by mounting the element that provides cam surface 72 with quick release clamps 74 that do not require any tools for operation. To shift cam surface 72, clamps 74 are released, the cam surface is shifted, and clamps 74 are tightened again to hold the cam surface in its new position. To further facilitate rapid and precise adjustment of cam surface 72 among several different positions, one end (or other similar surface) of cam member 72 may bear on another movable cam member which has different indicated positions for different indicated lengths L. To change length L, cam member 72 is unclamped, the other cam member mentioned in the preceding sentence is moved to the position indicated for the desired new length L, cam member 72 is pushed into contact with the other cam member, and cam member 72 is re-clamped in its new position.

As an alternative to shifting cam member 72 to change length L, that member may simply be removed and replaced by another cam member having a different location of the transition between cam surface portions B and C.

If desired, the length L appropriate for a particular slot length can be established automatically or semiautomatically. Considering FIG. 1, it will be noted that the left-hand (proximal) end of armature core 16 is always at the same location relative to apparatus 20, regardless of the length of the core. Thus the length of slots 17 can be determined by sensing the location of the right-hand (distal) end of core 16 relative to apparatus 20. Cam member 72 can then be shifted left or right based on the sensed location of the right-hand end of core 16. For example, an arm, which extends forward and down to the distal end of core 16, can be attached to cam member 72. Then, with cam member 72 unclamped, this assembly is moved left or right until the arm contacts the right-hand end of core 16. Cam member 72 is then clamped in the resulting position and the apparatus will thereafter produce lengths L that are exactly the correct length for the slots 17 in core 16.

Figure 8:
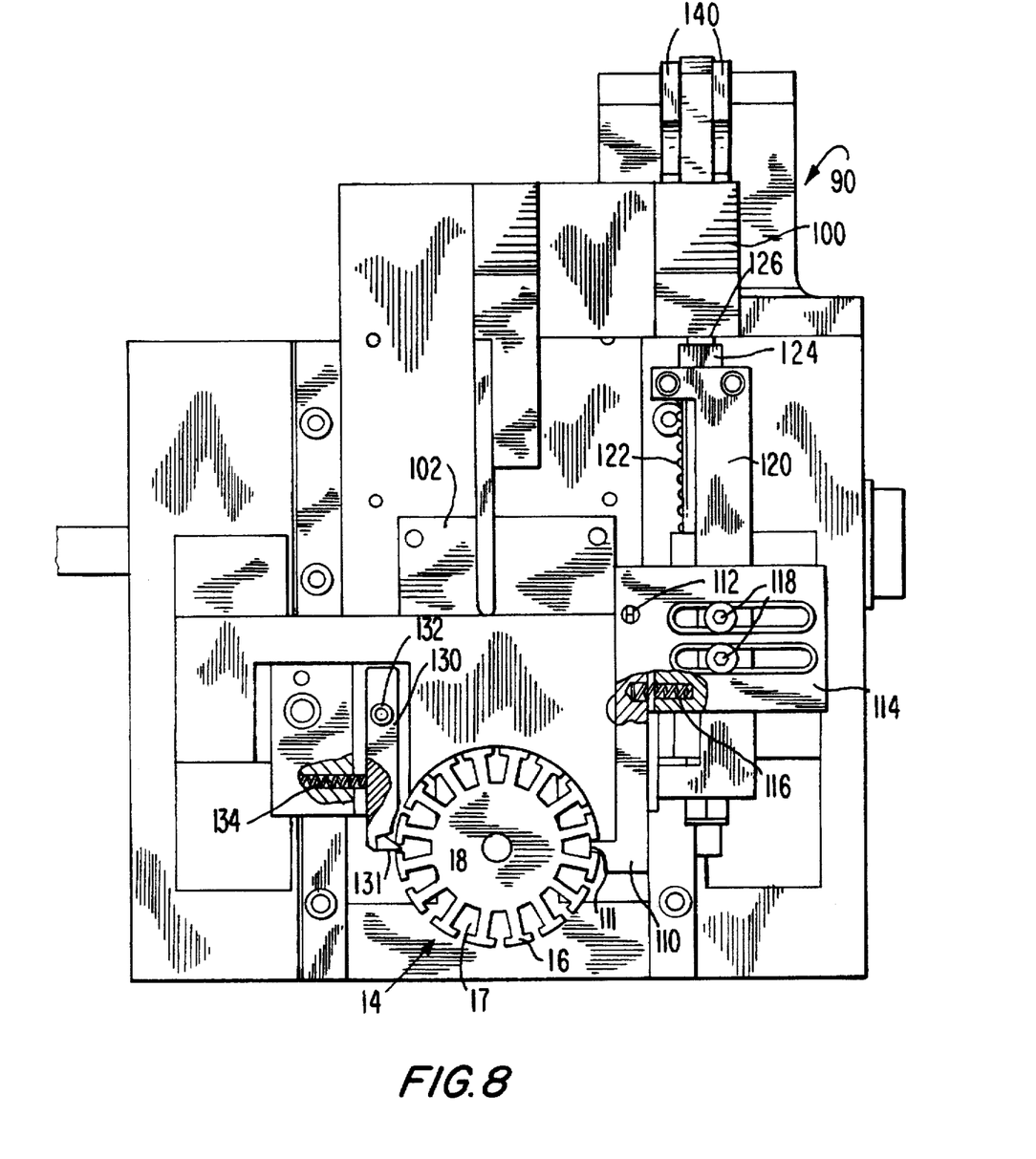
FIG. 8 is an elevational view, partly in section, of the end of the apparatus which is shown in FIGS. 5 and 6.

More detail regarding the dynamo-electric machine part indexing portion of the apparatus is best provided with reference to FIG. 8. Indexing pawl 110 is pivotally mounted to adjustable arm 114 via pivot shaft 112. Pawl 110 is resiliently urged to pivot about shaft 112 in the clockwise direction as viewed in FIG. 8 by prestressed compression coil spring 116. This resiliently inserts a tooth 111 on pawl 110 into the opening of an armature slot 17 which is adjacent to that tooth. Arm 114 is adjustable left or right as view in FIG. 8 by loosening bolts 118, shifting arm 114 as desired, and then retightening bolts 118. This facilitates accommodating armatures having different diameters. It also allows control of the amount by which tooth 111 enters the adjacent armature slot 17.

Figure 5:
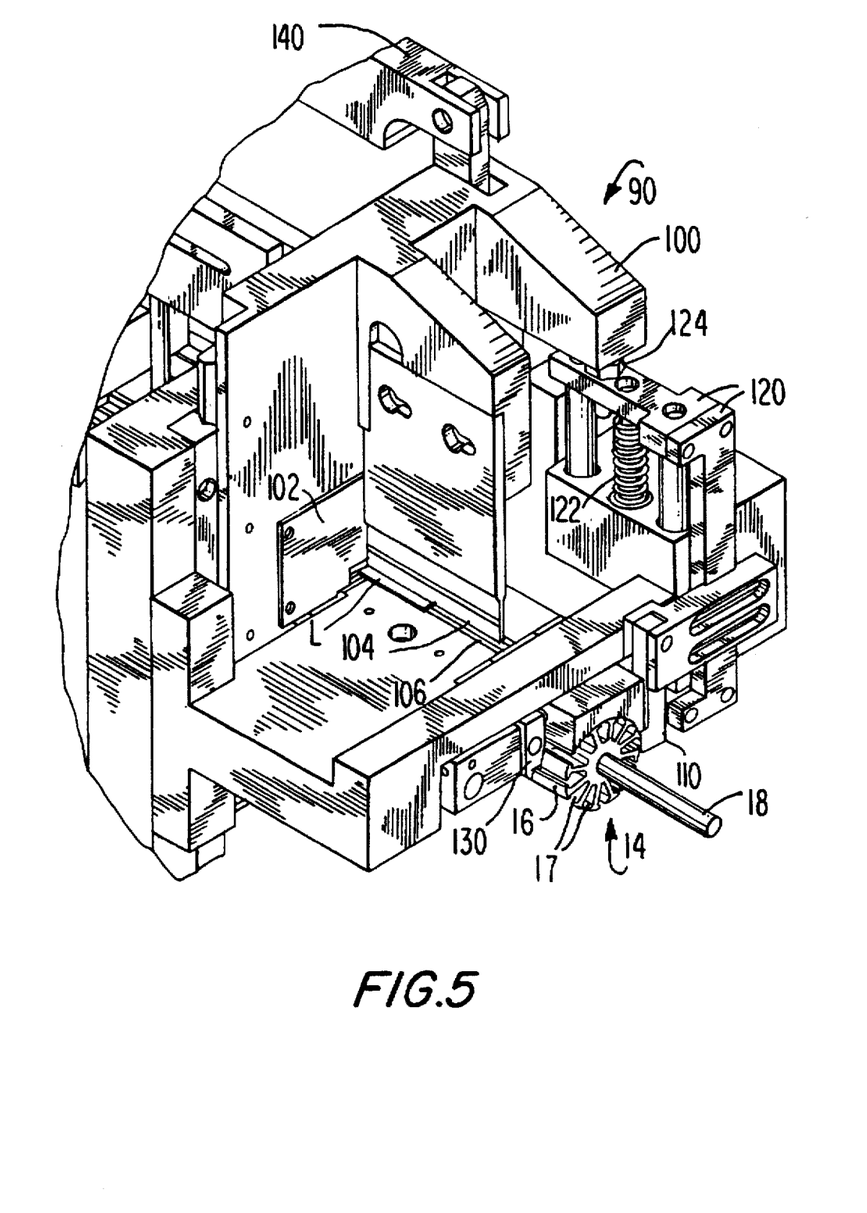
FIG. 5 is an isometric view of a portion of the end of the apparatus which is on the right in FIG. 1.
Figure 6:
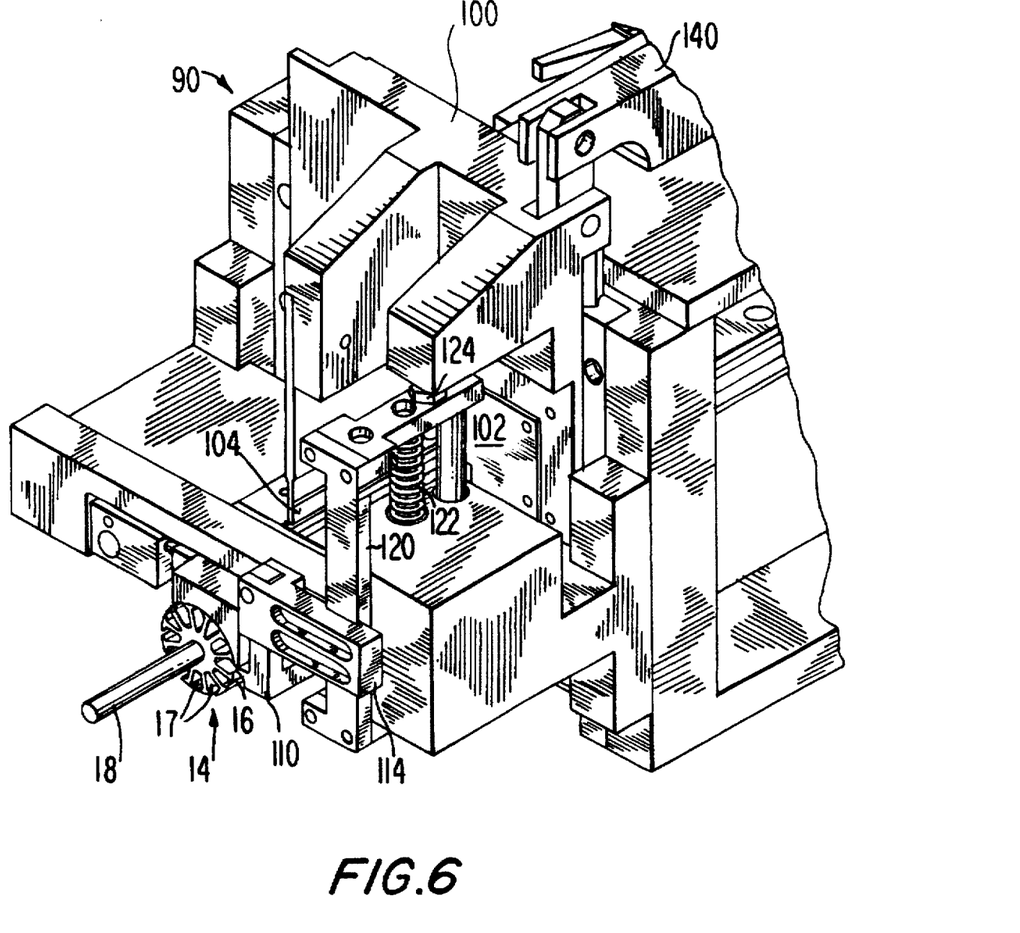
FIG. 6 is an isometric view of the same portion of the apparatus which is shown in FIG. 5, but seen from a different direction than in FIG. 5.

Arm 114 is mounted on a frame 120 which is movable downwardly from the position shown in FIG. 8 (see also FIGS. 5 and 6). Frame 120 is resiliently urged to its depicted upper position by prestressed compression coil spring 122. Frame 120 is moved down by downward motion of above-described subassembly 100 acting on the top of rod 126 which is threaded into frame 120. Rod 126 is locked in place with the desired (adjustable) extension from frame 120 by nut 124. Prior to each downward stroke of subassembly 100 a clearance preferably exists between subassembly 100 and the top of rod 126. This helps avoid transmission of possible vibration of lever 140 to the indexing mechanism.

When subassembly 100 moves down, frame 120, arm 114, and pawl 110 move down with it (after the above-mentioned initial clearance is closed). This causes tooth 111 to leave the armature slot 17 in which it is initially disposed. The lower surface of tooth 111 is shaped, and the force of spring 116 is selected, to facilitate this downward motion of the tooth without exerting undue clockwise rotational force on armature 18. Armature 18 is also prevented from rotating clockwise by stop pawl 130. Stop pawl 130 has a tooth 131 which engages the opening of another armature slot 17. Stop pawl 130 is pivotable about pivot shaft 132, and is resiliently biased to pivot counter-clockwise about that shaft by prestressed compression coil spring 134. Stop pawl 130 is mounted on the portion of assembly 90 which does not move down with subassembly 100.

When subassembly 100 begins to move back up, elements 120, 114, and 110 also begin to move back up under the influence of spring 122. Tooth 111 enters the opening of the armature slot 17 below the slot that it left during the immediately preceding downward stroke. Thereafter, as pawl 110 continues to move back up, it causes armature 14 to rotate counter-clockwise by an amount equal to the angle between two adjacent slots 17. During this rotation stop pawl 130 leaves its initial slot 17 and enters the next slot 17 at the end of the rotational motion. The upper surface of tooth 131 is shaped, and the force of spring 134 is selected, to permit this clockwise rotation of armature 14.

It should be noted that assembly 90 can be readily constructed so that it is easily and rapidly removable as a unit if desired. This facilitates modification or replacement of this assembly when differently configured dynamo-electric machine parts are to be processed. For example, such changes may include different numbers or sizes of slots, requiring a change in the shape of die 106 or in the indexing motion of pawl 110. Mere changes in slot length can generally be accommodated as described in the preceding paragraphs and typically do not require modification of assembly 90.

The many advantages of the methods and apparatus of this invention will be apparent to those skilled in the art from what has been said. Machine part inertia has almost no effect on the feeding of strip 10. There are no heavy machine parts such as feed rollers to start and stop when it is desired to start and stop each strip feeding cycle. This helps the apparatus maintain very precise strip lengths L even when the machine is operated very rapidly. The apparatus is also quickly, easily, and straightforwardly adjustable to change length L. For example, and as has been noted, there is a linear, one-for-one relationship between length L and the location of the transition between portions B and C of cam surface 72.

Another advantage of the depicted preferred embodiment is that a portion of the necessary work on the strip and the dynamo-electric machine part is performed during the return stroke of clamp assembly 40. This refers to the fact that the strip is cut off and formed, and the dynamo-electric machine part is indexed, during the return stroke of assembly 40. This helps to increase the production rate of the apparatus without requiring faster or longer motions of various machine components. It also makes possible an increased production rate without having to increase the speed of travel of the insulating material. This also facilitates precise control of the lengths of insulating material supplied, as well as reducing the risk of damage to those insulating material lengths.

On the other hand, the machine can be very easily reorganized, if desired, so that a given length of insulating material is fed out, cut off, formed, and inserted in a slot, all during a given forward stroke of clamp assembly 40. In this alternative the desired length of insulating material would be fed out during a first portion of the forward stroke of assembly 40. The fed out insulating material would then be cut off and formed during a second portion of the forward stroke of assembly 40. Lastly, the formed insulating material would be inserted in a slot 17 during a third portion of the forward stroke of assembly 40. Only indexing of the dynamo-electric machine part would take place during the return stroke of assembly 40. This alternative might require a longer stroke for assembly 40, as well as different phasing between the motions of assembly 40 and subassembly 100, but it would mean that only one length of strip 10 would be in process during any one cycle of operation of the machine.

Figure 9:
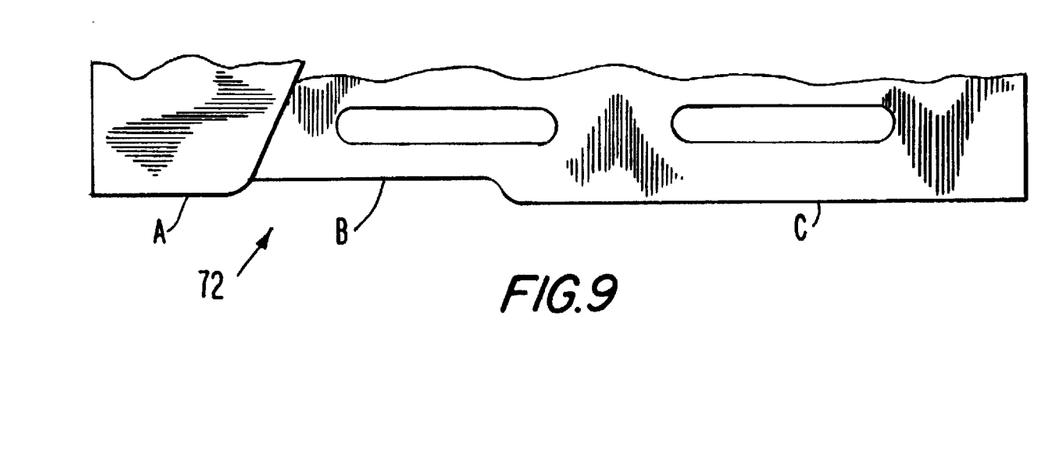
FIG. 9 is a simplified elevational view of an alternative embodiment of a portion of the apparatus shown in the other Figures.

If for any reason it is desired to start the feeding of insulating material 10 after the start of each forward stroke of clamp assembly 40, this can be done by providing an initial portion A of cam surface 72 which is somewhat like portion C but which precedes the effective part of portion B. An illustrative cam arrangement of this type is shown in FIG. 9. Initial cam portion A (on which cam follower roller 56 bears during an initial portion of the forward stroke of clamp assembly 40) is preferably independent of portions B and C. For example, cam portion A may be fixed to the frame of the machine, or it may be adjustable (left and right) relative to the frame of the machine independent of the above-described left-right adjustability of portions B and C. When clamp assembly 40 reaches the end of its return stroke, latch 62 releases as described above. This allows cam follower roller 56 to contact initial cam portion A. Cam portion A is prominent enough relative to cam portion B to prevent jaws 44 and 46 from clamping insulating material 10, but not so prominent that latch 62 can re-latch lever 50. Clamp assembly 40 therefore begins its forward stroke without clamping insulating material 10. As long as cam follower roller 56 is bearing on cam portion A, the forward stroke of clamp assembly 40 proceeds without any corresponding forward motion of insulating material 10. When roller 56 leaves portion A for portion B, however, the insulating material is clamped and fed forward until roller 56 reaches the transition between regions B and C. Clamp assembly 40 then unclamps the insulating material (which stops) and the clamp assembly completes its forward stroke with no further forward motion of the insulating material.

By having portion A fixed, the starting point of insulating material 10 can be fixed (similar to the fixed starting point when portion A is omitted). The length L of material fed out and cut off remains adjustable by left-right adjustment of portions B and C as was described earlier. Alternatively, by having portion A adjustable independently of portions B and C, both the point at which material 10 feeding begins and the point at which that feeding ends can be made independently adjustable.

It will be understood that the foregoing is only illustrative of the principles of the invention and that various modifications can be made by those skilled in the art without departing from the scope and spirit of the invention. For example, although armature slot liners are the subject of the depicted illustrative embodiment, the same principles can be readily applied to armature coil stays or to interpole liners or coil stays for stators. As another example of a modification within the scope of this invention, it may not be necessary to have cam follower roller 56 actually bear on a cam surface during clamping of strip 10 between jaws 44 and 46. Thus it may be possible to eliminate cam surface portions B and to provide only portion C or portions A and C as desired.

The invention claimed is:

1. Apparatus for inserting lengths of strip material into slots in dynamo-electric machine parts comprising:
a source of a continuous strip of said material;
a clamp assembly which reciprocates substantially parallel to a longitudinal axis of said strip, said clamp assembly releasably clamping said strip during at least a portion of each of its strokes in one direction in order to feed out a length of said strip substantially equal to said length of said stroke portion during which said clamp assembly clamps said strip;
a cutter operative during each stroke of said clamp assembly opposite said one direction for cutting off the length of said strip fed out during the preceding stroke of said clamp assembly in said one direction; and
an inserter operative during each stroke of said clamp assembly in said one direction for inserting the length of said strip cut off during the preceding stroke of said clamp assembly opposite said one direction into a slot in a dynamo-electric machine part.

2. The apparatus defined in claim 1 wherein said clamp assembly clamps said strip during only a portion of said stroke in said one direction.

3. The apparatus defined in claim 2 wherein said clamp assembly begins to clamp said strip at a first predetermined point during said stroke in said one direction, and wherein said clamp assembly releases said strip at a second predetermined point during said stroke in said one direction.

4. The apparatus defined in claim 3 wherein said first point is the start of said stroke in said one direction.

5. The apparatus defined in claim 3 wherein said second point is adjustable to change said length of said fed out strip.

6. The apparatus defined in claim 1 wherein said clamp assembly comprises a clamp jaw which is movable transverse to said longitudinal axis of said strip to clamp said strip to said clamp assembly when said clamp jaw moves into contact with said strip and to release said strip when said clamp jaw moves out of contact with said strip.

7. The apparatus defined in claim 6 wherein said clamp jaw is moved by a cam follower which follows a cam surface as said clamp assembly moves in said one direction.

8. The apparatus defined in claim 7 wherein said cam surface is generally aligned with said longitudinal axis and said cam follower moves along said cam surface equidistantly with movement of said clamp assembly parallel to said longitudinal axis.

9. The apparatus defined in claim 8 wherein said cam surface has a first portion which is traversed by said cam follower during a relatively early portion of said stroke in said one direction and a second portion which is traversed by said cam follower during a subsequent portion of said stroke in said one direction, wherein said clamp jaw clamps said strip to said clamp assembly while said cam follower is traversing said first portion of said cam surface, and wherein said clamp jaw releases said strip while said cam follower is traversing said second portion of said cam surface.

10. The apparatus defined in claim 9 wherein said cam surface is adjustable parallel to said longitudinal axis relative to endpoints of the reciprocation of said clamp assembly to change the point along said stroke in said one direction at which said clamp jaw releases said strip.

11. The apparatus defined in claim 1 further comprising a strip retarding structure for resisting feeding of said strip by said clamp assembly.

12. The apparatus defined in claim 1 further comprising:
 a former for shaping the cut off length of said strip for insertion into said slot, said former operating on said cut off length of said strip after operation of said cutter but before operation of said inserter.

13. The apparatus defined in claim 12 wherein said former comprises:
 a forming die; and
 a forming blade for pushing said cut off length of said strip into said forming die.

14. The apparatus defined in claim 1 wherein said inserter reciprocates with said clamp assembly along an inserter axis which is parallel to but laterally spaced from said longitudinal axis of said strip, and wherein said apparatus further comprises a transfer mechanism for transferring said cut off length of said strip from said longitudinal axis to said inserter axis.

15. The apparatus defined in claim 14 wherein said transfer mechanism is operable during a portion of each stroke of said clamp assembly which is in a second direction opposite to said first direction.

16. The apparatus defined in claim 1 wherein said inserter is mounted for movement with said clamp assembly but is movable relative to said clamp assembly in the event that said inserter encounters more than a predetermined threshold resistance to insertion of said cut off length into said slot.

17. The apparatus defined in claim 15 wherein said transfer mechanism includes a former for shaping the cut off length of said strip for insertion into said slot.

18. The apparatus defined in claim 1 wherein said dynamo-electric machine part has a plurality of said slots, and wherein said apparatus further comprises an indexer for moving said dynamo-electric machine part to position a new slot to receive a cut off length of said strip after a preceding slot has received a cut off length of said strip.

19. The apparatus defined in claim 1 further comprising:
 a latch for preventing said clamp assembly from clamping said strip during any portion of its stroke in a second direction which is opposite to said first direction.

20. The apparatus defined in claim 19 further comprising a latch release for releasing said latch at the end of said stroke in said second direction.

21. The apparatus defined in claim 16 further comprising a sensor for detecting movement of said inserter relative to said clamp assembly in order to indicate a malfunction of said apparatus.

* * * * *